United States Patent [19]

Kamiyama et al.

[11] Patent Number: 4,552,944
[45] Date of Patent: Nov. 12, 1985

[54] PROCESS FOR PREPARING THERMALLY STABLE SUPER-SOFT POLYURETHANE ELASTOMER

[75] Inventors: Masayuki Kamiyama; Takashi Saito; Kiyotsugu Asai, all of Kanagawa, Japan

[73] Assignee: Mitsui-Nisso Corporation, Tokyo, Japan

[21] Appl. No.: 652,480

[22] Filed: Sep. 20, 1984

[30] Foreign Application Priority Data

Sep. 22, 1983 [JP] Japan ............................ 58-174172

[51] Int. Cl.$^4$ ............................................. C08G 18/48
[52] U.S. Cl. ........................................ 528/55; 528/56
[58] Field of Search ................................... 528/55, 56

[56] References Cited

U.S. PATENT DOCUMENTS

| 4,067,834 | 1/1978 | Olstowski | 528/48 |
| 4,101,704 | 8/1978 | Hiles | 528/55 |

FOREIGN PATENT DOCUMENTS

| 1707975 | 10/1975 | United Kingdom . |
| 3088176 | 8/1976 | United Kingdom . |
| 1564195 | 10/1976 | United Kingdom . |

*Primary Examiner*—Maurice J. Welsh
*Attorney, Agent, or Firm*—Fisher, Christen & Sabol

[57] ABSTRACT

A super-soft polyurethane elastomer is prepared by reacting an organic polyisocyanate in the presence of a specified organometallic catalyst, with a molar ratio specified mixture of (a) low molecular weight triol and high molecular weight polyol, or (b) low molecular weight triol, aromatic ring containing low molecular weight diol and high molecular weight polyol.

22 Claims, No Drawings

PROCESS FOR PREPARING THERMALLY STABLE SUPER-SOFT POLYURETHANE ELASTOMER

BACKGROUND OF THE INVENTION

1. Field of the Invention

This invention relates to a process for preparing a polyurethane elastomer. More particularly, it relates to a process for preparing a super-soft polyurethane elastomer having an improved thermal stability.

2. Description of the Prior Art

Polyurethane elastomers are used for various mechanical parts because of their excellent mechanical properties and their resistance to wear, solvent and weathering.

When a polyurethane elastomer is used as a vibration insulator, an impact absorber, or a medical plastic in particular, a super-soft property is required and its hardness should be extremely reduced.

According to the typical process, as described in the specification of British Pat. No. 1,564,195, super-soft polyurethane elastomer is prepared by reacting polyethylene glycol or polypropylene glycol with a polyisocyanate in less than stoichiometric amount in the presence of a tertially amine catalyst.

In this method, however, a polymer chain does not form completely in the resultant super-soft polyurethane elastomer.

The elastomer thus obtained can retain its shape and vibration absorbing ability at ordinary temperatures. And yet the elastomer greatly reduces load bearing capacity and is deformed or destroyed, when the temperature of elastomer is raised during use at elevated temperatures or as a result of heat generation due to the vibration. The medical plastic is required to stand disinfection by boiling.

A conventional organometallic polyurethane catalyst such as dibutyltin dilaurate or lead octoate is added as a countermeasure to accerelate polymerization. The catalyst, however, causes rapid viscosity increase of the ingredient mixture and makes molding procedure difficult. Furthermore, the permanence property of the super-soft polyurethane elastomer at elevated temperatures is reduced due to the deterioration effect of the catalyst.

SUMMARY OF THE INVENTION

It is an object of the present invention to provide a process for preparing a super-soft polyurethane elastomer having a shore (00) hardness of 40 to 85 and a 100% tensile modulus of 0.5 to 10 kg/cm$^2$. It is an another object of the present invention to provide a process for preparing the super-soft polyurethane elastomer having both dimensional stability and permanence property at elevated temperatures.

The present invention provides a process for preparing the super-soft polyurethane elastomer which comprises reacting a polymeric hydroxyl compound with an organic polyisocyanate in the presence of at least one organometallic catalyst selected from the group consisting of nickel, cobalt, manganese, iron, cupper and zinc compounds, wherein said polymeric hydroxy compound comprises (A) a polyalkylene ether triol or a mixture thereof with a polyalkylene ether diol of phenolic hydroxy or aromatic ring containing amino compound having a low molecular weight of 400 to 1500 and (B) a polyalkylene ether polyol having a high molecular weight of 2000 to 6000, at a (A):(B) molar ratio of 35:65 to 70:30.

DESCRIPTION OF THE PREFERRED EMBODIMENTS

The organometallic catalyst which may be in use for the present invention is acetylacetonate, aliphatic and cycloaliphatic carboxylate, aromatic carboxylate, and phenolate of nickel, cobalt, manganese, iron, copper, and zinc. Examples of the organometallic catalyst include nickel acetylacetonate, cobalt acetylacetonate, manganese acetylacetonate, iron acetylacetonate, copper acetylacetonate, zinc acetylacetonate, nickel naphthenate, cobalt naphthenate, manganese naphthenate, iron naphthenate, copper naphthenate, nickel 2-ethyl hexoate, cobalt 2-ethyl hexoate, manganese linolate, nickel stearate, manganese benzoate, iron benzoate, nickel-2.2'-sulfonyl bis(p-dodecylphenolate), cobalt-2.2'-sulfonyl bis(p-nonylphenolate), zinc 8-hydroxyquinolinate and the like.

The organometallic catalyst is applied singly or in combination. The quantity in use is 0.01 to 5.0 parts by weight per 100 parts by weight of the polymeric hydroxy compound and more particularly 0.1 to 3.0 parts by weight is preferable. The quantity below this range causes no effect on the reaction and that beyond this range results in the reduction of properties on the resultant super-soft polyurethane elastomer.

The polyalkylene ether triol having a low molecular weight of 400 to 1500 which may be in use for the present invention is obtained by addition of propylene oxide, ethylene oxide, or propylene oxide and ethylene oxide to glycerol, hexane triol, trimethylol propane, triethanol amine, tripropanol amine, amino phenol, amino naphthol, and the like.

The polyalkylene ether diol having a low molecular weight of 400 to 1500 is obtained by addition of ethylene oxide, propylene oxide, or propylene oxide and ethylene oxide to a phenolic hydroxy compound such as 4,4'-dihydroxydiphenyl propane, 4,4'-dihydroxydiphenyl methane, 4,4'-dihydroxydiphenyl ether, 4,4'-dihydroxy biphenyl, hydroquinone and resorcine, or an aromatic ring containing amino compound such as aniline, naphthylamine and benzylamine.

The polyalkylene ether polyol having a high molecular weight of 2000 to 6000 is known as a material for producing flexible polyurethane foams. Examples of the polyol include propylene oxide or propylene oxide and ethylene oxide addition products of ethylene glycol, propylene glycol, glycerol, trimethylol propane, pentaerythritol, methyl diethanol amine, triethanol amine, ethylene diamine, tolylenediamine, diphenylmethane diamine, and the like.

In the process of this invention, the polyalkylene ether triol or the mixture thereof with the polyalkylene ether diol of the phenolic hydroxy or aromatic ring containing amino compound having a low molecular weight of 400 to 1500 is used in combination with a polyalkylene ether polyol having a high molecular weight of 2000 to 6000 at the molar ratio of 35:65 to 70:30.

The organic polyisocyanate which may be used in the present invention includes, for example, 2,4-tolylene diisocyanate, 2,6-tolylene diisocyanate, and mixtures thereof, diphenylmethane-4,4'-diisocyanate, 3,3'-dimethyl-4,4'-biphenylene diisocyanate, xylylene diisocyanate, dicyclohexylmethane-4,4'-diisocyanate, isophorone diisocyanate, hexamethylene diisocyanate, hydrogenated xylylene diisocyanate, crude tolylene diisocyanate, polymethylene polyphenylisocyanate, isocyanurate modified tolylene diisocyanate, isocyanurate modified diphenylmethane-4,4'-diisocyanate, carbodiimide modified tolylene diisocyanate, and carbodiimide modified diphenylmethane-4,440 diioscyanate.

The organic polyisocyanate is applied singly or in combination. A prepolymer of the polyisocyanate may also be used for the present invention and often improves properties of the resultant super-soft polyurethane elastomer.

The organic polyisocyanate and the polymeric hydroxy compound are reacted at a NCO/OH equivalent ratio of 0.4 to 1.4, preferably 0.5 to 1.2. The super-soft polyurethane elastomer exhibits lowered vibration absorbing ability when the NCO/OH ratio exceeds this range and reduced mechanical properties below this range.

Inorganic and organic fillers, plasticizers, stabilizers and pigments may be used in the present invention. The inorganic fillers include, for example, calcium carbonate, talc, clay, mica, graphite, aluminum hydroxide, calcium hydroxide, magnesium hydroxide, calcium sulfate, zinc oxide, alminum oxide, titanium oxide, iron oxide, silica flour, iron powder, glass flake and carbon black. Bitumen, rosin, woodflour, natural and manmade fibers are used as organic fillers.

Moreover, microballoons such as silica balloons glass balloons phenolic resin balloon and polyvinylidene chloride balloons are effective in the present invention. The plasticizers include, for example, dibutyl phthalate, dioctyl phthalate, tricresyl phosphate, tris(2-chloroethyl) phosphate, tris chloropropyl phosphate, tris(2.3-dichloropropyl) phosphate, tris (2.3-dibromopropyl) phosphate, dioctyl adipate and dibutyl sebacate.

Stabilizers may be added to extend service life of the super-soft polyurethane elastomer.

These stabilizers are antioxidants such as hindered phenolic, ultraviolet absorbers such as benzotriazole and benzophenone derivatives, and ultraviolet stabilizers such as hindered amines.

Working of the present invention is proceeded by mixing the active hydrogen containing compound, organic metal compound, plasticizer, filler and other additives on a roll. The solution thus obtained is mixed with the organic polyisocyanate and poured into a mold maintained at 25° to 70° C., followed by heating for 10 to 30 minutes at 70° to 90° C.

A solid product is taken out of the mold before postcuring for 24 hours at 90° C. or 30 minutes at 150° C.

The hardness of super-soft polyurethane elastomer is measured on the Shore(00)scale and other mechanical strengths are determined in accordance with JIS K-6301. The elastomer is extremely soft, having a hardness of 40 to 85 and a 100% tensile modulus of 0.5 to 10 kg/cm$^2$.

Neither dimensional change nor hardness reduction is found after heating the elastomer for 2 weeks at 100° C. Thus the super-soft elastomer of the present invention exhibits excellent vibration insulation for a long time at elevated temperatures.

On the contrary, the super-soft polyurethane elastomers obtained by use of a conventional polyurethane catalyst are fused or greatly deformed after standing for a couple of days at 100° C.

EXAMPLE 1

Two hundred grams of diphenylmethane-4,4'-diisocyanate was reacted with 34.2 g of a polypropylene ether diol having a molecular weight of 2000 at 90° C. for 2 hours. The isocyanate content of the resultant prepolymer(hereinafter referred to as prepolymer A) was 28.0%.

Six hundred grams of a polyalkylene ether polyol having a molecular weight of 3000 obtained by addition of propylene oxide to glycerol (0.2 mol), 200 g of a polyalkylene ether triol having a molecular weight of 700 obtained by addition of propylene oxide to glycerol (0.29 mol), 100 g of dioctyl phthalate, 100 g of calcium carbonate, and 4 g of nickel acetyl acetonate were mixed on a roll at room temperature, followed by mixing under vacuum at 100° C.

The liquid mixture thus obtained was mixed with 110 g of prepolymer A, and poured into a mold which was previously maintained at 60° C.

A solid product was taken out of the mold after heating at 80° C. for 10 minutes and further postcured at 100° C. for 24 hours.

In this example, the molar ratio of low molecular weight polyol to high molecular weight polyol is 59:41, and the NCO/OH equivalent ratio is 0.5.

The resultant super-soft polyurethane elastomer had a shore (00) hardness of 57, a 100% tensile modulus of 2.8 kg/cm$^2$, a tensile strength of 21 kg/cm$^2$, and an elongation of 500%.

A block of this super-soft elastomer caused no dimensional change and retained the shore (00) hardness of 57, after standing for 2 weeks at 100° C.

EXAMPLE 2

Two thousand five hundred and thirty grams of a polyalkylene ether polyol having a molecular weight of 3000 obtained by addition of propylene oxide and ethylene oxide to glycerol (0.8 mol), 100 g of a polyalkylene ether triol having a molecular weight of 1500 obtained by addition of propylene oxide and ethylene oxide to glycerol (0.07 mol), 950 g of a polyalkylene ether triol having a molecular weight of 700 obtained by addition of propylene oxide to glycerol (1.4 mol), 3020 g of dioctyl phthalate, 3020 g of calcium carbonate, 18 g of manganese naphthenate, and 163 g of carbon black, were mixed on a roll, followed by mixing under vacuum in a planetary mixer at 100° C.

A thousand grams of liquid mixture thus obtained were further mixed with 532 g of 80/20 tolylene diisocyanate and poured into a mold which was previously maintained at 70° C. A solid product was taken out of the mold after heating at 80° C. for 10 minutes, and further postcured at 100° C. for 12 hours.

In this experiment, the molar ratio of low molecular weight polyol to high molecular weight polyol was 65:35, and the NCO/OH equivalent ratio was 0.9.

The super-soft polyurethane elastomer thus obtained had a shore (00) hardness of 84, a 100% tensile modulus of 5.3 kg/cm$^2$, a tensile strength of 23 kg/cm$^2$, and an elongation of 420%.

After standing for 2 weeks at 100° C., a block of this super-soft elastomer caused no dimensional change and had a shore (00) hardness of 84.

EXAMPLE 3

Five hundred and forty grams of polyalkylene ether polyol having a molecular weight of 2000 obtained by addition of propylene oxide to ethylene glycol (0.27 mol), 60 g of polyalkylene ether polyol having a molecular weight of 3000 obtained by addition of propyleneoxide to glycerol (0.02 mol), 20 g of polyalkylene ether triol having a molecular weight of 700 obtained by addition of propylene oxide and ethylene oxide to glycerol (0.03 mol), 180 g of polyalkylene ether diol having a molecular weight of 400 obtained by addition of propylene oxide to 4,4'-dihydroxydiphenyl propane (0.45 mol), 100 g of dioctyl phthalate, 100 g of calcium carbonate, and 4 g of cobalt naphthenate were treated as described in Example 1 to make a liquid mixture.

The liquid mixture obtained was reacted with 160 g of prepolymer A as in Example 1 and the solid product obtained was postcured at 120° C. for an hour. In this example, the molar ratio of low molecular weight polyol to high molecular weight polyol was 62:38, and the NCO/OH equivalent ratio was 0.7.

The super-soft polyurethane elastomer obtained had a shore (00) hardness of 50, a 100% tensile modulus of 2.5 kg/cm$^2$, a tensile strength of 20 kg/cm$^2$, and an elongation of 600%.

After standing for 2 weeks at 100° C., a block of the super-soft polyurethane elastomer had no dimensional change and retained its original shore (00) hardness of 50.

EXAMPLE 4

Sixty grams of a polyalkylene ether polyol having a molecular weight of 3000 obtained by addition of propylene oxide to glycerol (0.02 mol), 540 g of a polyalkylene ether polyol having a molecular weight of 2000 obtained by addition of propylene oxide and ethylene oxide to ethylene glycol (0.27 mol), 230 g of a polyalkylene ether triol having a molecular weight of 700 obtained by addition of propylene oxide to glycerol (0.33 mol), 100 g of dioctyl phthalate, 100 g of calcium carbonate, 2.5 g of cobalt naphthenate, and 1.7 g of iron acetylacetonate were treated as in Example 1 to make a liquid mixture.

The liquid mixture obtained was reacted with 165 g of prepolymer A as in Example 1 and the solid product obtained was postcured at 120° C. for an hour.

In this example, the molar ratio of low molecular weight polyalkylene ether polyol to high molecular weight polyalkylene ether polyol was 53:47, and the NCO/OH equivalent ratio was 0.7.

The super-soft polyurethane elastomer obtained had a shore (00) hardness of 67, a 100% tensile modulus of 3.1 kg/cm$^2$, a tensile strength of 24 kg/cm$^2$, and an elongation of 550%.

After standing for 2 weeks at 100° C., a block of the super-soft polyurethane elastomer had no dimensional change and retained the original hardness of shore (00) 67.

COMPARATIVE EXAMPLE 1

Four grams of dibutyltin dilaurate was used in place of nickel acetyl acetonate in Example 1. The solid product obtained by treating the ingredients as in Example 1 was fused when postcuring at 100° C.

COMPARATIVE EXAMPLE 2

Four grams of lead 2-ethyl-hexoate was used in place of cobalt naphthenate in Example 1. The solid product obtained was postcured at 100° C. for 12 hours.

The resultant super-soft polyurethane elastomer had a shore (00) hardness of 50.

A block of this elastomer greatly deformed after standing for 2 weeks at 100° C.

EXAMPLE 5

Ten grams of a polyalkylene ether polyol having a molecular weight of 3000 obtained by addition of propylene oxide to glycerol (0.003 mol), 30 g of a polyalkylene ether polyol having a molecular weight of 2000 obtained by addition of propylene oxide and ethylene oxide to ethyleneglycol (0.015 mol), 4 g of a polyalkylene ether triol having a molecular weight of 700 obtained by addition of propylene oxide to glycerol (0.006 mol), 7 g of a polyalkylene ether diol having a molecular weight of 400 obtained by addition of propylene oxide to 4,4'-dihydroxydiphenylpropane (0.018 mol), 15 g of dioctylphthalate, 34 g of calcium carbonate, and 0.5 g of cobalt naphthenate were treated as described in Example 1 to make a liquid mixture. The liquid mixture obtained was reacted with 10 g of carbodiimide modified diphenylmethane diisocyanate, whose isocyanate content was 28.0%, as in Example 1 and the solid product obtained was postcured at 120° C. for an hour.

In this example, the molar ratio of low molecular weight polyol to high molecular weight polyol was 57:43, and the NCO/OH equivalent ratio was 0.71.

The super-soft polyurethane elastomer obtained has a shore (00) hardness of 45, a 100% tensile modulus of 1.9 kg/cm$^2$, a tensile strength of 16 kg/cm$^2$, and an elongation of 310%.

After standing for 2 weeks at 100° C., a block of the super-soft polyurethane elastomer had no dimensional change and retained its original shore (00) hardness of 45.

EXAMPLE 6

Nine hundred and twenty seven grams of isophorone diisocyanate was reacted with 73 g of trimethylol propane at 120° C. for 10 hours. The isocyanate content of the resultant prepolymer (hereinafter referred to as prepolymer B) was 28.0%.

Ten grams of a polyalkylene ether polyol having a molecular weight of 3000 obtained by addition of propylene oxide to glycerol (0.003 mol), 30 g of a polyalkylene ether polyol having a molecular weight of 2000 obtained by addition of propylene oxide and ethylene oxide to ethylene glycol (0.015 mol), 4 g of a polyalkylene ether triol having a molecular weight of 700 obtained by addition of propylene oxide to glycerol (0.006 mol), 7 g of a polyalkylene ether diol having a molecular weight of 400 obtained by addition of propylene oxide to 4,4'-dihydroxyphenylpropane (0.018 mol), 15 g of dioctylphthalate, 34 g of calcium carbonate, and 0.5 g of cobalt naphthenate were treated as described in Example 1 to make a liquid mixture. The liquid mixture obtained was reacted with 10 g of prepolymer B as in Example 1 and the solid product obtained was postcured at 120° C. for 12 hours.

In this example, the molar ratio of low molecular weight polyol to high molecular weight polyol was 57:43, and the NCO/OH equivalent ratio was 0.71.

The super-soft polyurethane elastomer obtained had a shore (00) hardness of 42, a 100% tensile modulus of 1.6 kg/cm$^2$, a tensile strength of 17 kg/cm$^2$, and an elongation of 350%.

After standing for 2 weeks at 100° C., a block of the super-soft polyurethane elastomer had no dimensional change and retained its original shore (00) hardness of 42.

EXAMPLE 7

Five hundred and forty grams of polyalkylene ether polyol having a molecular weight of 2000 obtained by addition of propylene oxide to ethylene glycol (0.27 mol), 60 g of polyalkylene ether polyol having a molecular weight of 3000 obtained by addition of propylene oxide to glycerol (0.02 mol), 20 g of polyalkylene ether triol having a molecular weight of 700 obtained by addition of propylene oxide to glycerol (0.03 mol), 180 g of polyalkylene ether diol having a molecular weight of 400 obtained by addition of ethylene oxide to aniline (0.45 mol), 100 g of dioctyl phthalate, 100 g of calcium carbonate, and 1 g of copper acetyl acetonate were treated as in Example 1.

The liquid mixture obtained was reacted with 160 g of prepolymer A as in example 1.

In this example, the molar ratio of the mixture of low molecular weight triol and diol to high molecular weight polyol was 62:38, and the NCO/OH equivalent ratio was 0.7.

The super-soft polyurethane elastomer obtained had a shore (00) hardness of 44, a 100% tensile modulus of 1.8 kg/cm$^2$, a tensile strength of 17 kg/cm$^2$, and an elongation of 650%.

A block of this super-soft polyurethane elastomer caused no dimensional change and retained its original hardness of shore (00) 44, after standing for 2 weeks at 100° C.

EXAMPLE 8

Six hundred grams of polyalkylene ether polyol having a molecular weight of 3000 obtained by addition of propylene oxide to glycerol (0.2 mol), 100 g of a polyalkylene ether triol having a molecular weight of 700 obtained by addition of propylene oxide to triethanolamine (0.14 mol), 100 g of dioctyl phthalate, 100 g of calcium carbonate, 1 g of zinc acetylacetonate were mixed on a roll, followed by mixing under vacuum at 100° C. The liquid mixture thus obtained was mixed with 104 g of a mixture of polymethylene polyphenylisocyanate and carbodiimide modified diphenylmethane-4.4'-diisocyanate having an isocyanate content of 29.3%, and poured into a mold which was previously maintained at 60° C.

A solid product was taken out of the mold after heating at 80° C. for 10 minutes and further postcured at 100° C. for 24 hours.

In this example, the molar ratio of low molecular weight triol to high molecular weight polyol was 41:59, and NCO/OH equivalent ratio was 0.7.

The resultant super-soft polyurethane elastomer had a shore (00) hardness of 62, a 100% tensile modulus of 2.8 kg/cm$^2$, a tensile strength of 20 kg/cm$^2$, and an elongation of 470%.

A block of this super-soft polyurethane elastomer caused no dimensional change and retained its original hardness of shore (00) 62, after standing for 2 weeks at 100° C.

We claim:

1. A process for preparing a super-soft polyurethane elastomer which comprises reacting a polymeric hydroxy compound with one organic polyisocyanate in the presence of at least an organometallic catalyst selected from the group consisting of nickel, cobalt, manganese, iron, copper, and zinc compounds, thereby producing a super-soft polyurethane elastomer which does not undergo substantial change in Shore hardness nor 100 percent tensile modulus upon storage at 100° C. for two weeks.

2. A process as defined in claim 1 wherein the reaction of said polymeric hydroxy compound comprises polymerization and postcuring.

3. A process as defined in claim 1 wherein said super-soft polyurethane elastomer has a shore (00) hardness of 40 to 85, and a 100% tensile modulus of 0.5 to 10 kg/cm$^2$.

4. A process as defined in claim 1 wherein said polymeric hydroxy compound comprises (A) a polyalkylene ether triol having a molecular weight of 400 to 1500 and (B) a polyalkylene ether polyol having a molecular weight of 2000 to 6000, at a (A):(B) molar ratio of 35:65 to 70:30.

5. A process as defined in claim 1 wherein said polymeric hydroxy compound comprises (A) a mixture of a polyalkylene ether triol having a molecular weight of 400 to 1500 with a polyalkylene ether diol having a molecular weight of 400 to 1500, said diol being derived from a difunctional compound selected from the group consisting of phenolic hydroxy compounds and aromatic ring containing amino compounds, and (B) a polyalkylene ether polyol having a molecular weight of 2000 to 6000, at a (A):(B) molar ratio of 35:65 to 70:30.

6. A process as defined in claim 4 wherein said polyalkylene ether triol is obtained by addition of propylene oxide to a compound selected from the group consisting of glycerol and triethanol amine.

7. A process as defined in claim 4 wherein said polyalkylene ether triol is obtained by addition of propylene oxide to glycerol.

8. A process as defined in claim 5 wherein said polyalkylene ether diol is obtained by addition of propylene oxide to 4,4'-dihydroxydiphenyl propane.

9. A process as defined in claim 5 wherein said polyalkylene ether diol is obtained by addition of ethylene oxide to aniline.

10. a process as defined in claim 4 wherein said polyalkylene ether polyol is obtained by addition of propylene oxide to a compound selected from the group consisting of ethylene glycol, glycerol and triethanolamine.

11. A process as defined in claim 4 wherein said polyalkylene ether polyol is obtained by addition of ethylene oxide and propylene oxide to a compound selected from the group consisting of ethylene glycol and glycerol.

12. A process as defined in claim 1 wherein said organometallic catalyst is selected from the group consisting of nickel acetyl acetonate, iron acetyl acetonate, cobalt naphthenate, manganese naphthenate, copper acetyl acetonate, and zinc acetyl acetonate.

13. A process as defined in claim 1 wherein said organometallic catalyst is used at a quantity of 0.1 to 3.0 parts by weight per 100 parts by weight of said polymeric hydroxy compound.

14. A process as defined in claim 1 wherein said organic polyisocyanate is selected from the group consisting of tolylene diisocyanate, diphenylmethane diisocyanate, carbodiimide modified diphenylmethane diisocyanate, polymethylene polyphenylisocyanate, isophorone diisocyanate and mixture thereof.

15. A process as defined in claim 1 wherein said organic polyisocyanate is reacted with said polymeric hydroxy compound at a NCO/OH equivalent ratio of 0.5 to 1.2.

16. A process as defined in claim 5 wherein said polyalklene ether triol is obtained by addition of propylene oxide to a compound selected from the group consisting of glycerol and triethanol amine.

17. A process as defined in claim 5 wherein said polyalkylene ether triol is obtained by addition of propylene oxide to glycerol.

18. A process as defined in claim 5 wherein said polyalkylene ether polyol is obtained by addition of propylene oxide to a compound selected from the group consisting of ethylene glycol, glycerol and triethanolamine.

19. A process as defined in claim 5 wherein said polyalkylene ether polyol is obtained by addition of ethylene oxide and propylene oxide to a compound selected from the group consisting of ethylene glycol and glycerol.

20. A process as defined in claim 1 wherein said organic polyisocyanate is reacted to form a prepolymer and the prepolymer is reacted with said polymeric hydroxy compound.

21. A super-soft polyurethane elastomer obtained by the process of claim 1.

22. A super-soft polyurethane elastomer obtained by the process of claim 20.

* * * * *